US011173868B2

(12) United States Patent
Yamamoto et al.

(10) Patent No.: US 11,173,868 B2
(45) Date of Patent: Nov. 16, 2021

(54) GAS GENERATOR

(71) Applicant: DAICEL CORPORATION, Osaka (JP)

(72) Inventors: Koji Yamamoto, Tokyo (JP); Mikio Yabuta, Tokyo (JP)

(73) Assignee: DAICEL CORPORATION, Osaka (JP)

(*) Notice: Subject to any disclaimer, the term of this patent is extended or adjusted under 35 U.S.C. 154(b) by 4 days.

(21) Appl. No.: 16/631,515

(22) PCT Filed: Jul. 9, 2018

(86) PCT No.: PCT/JP2018/025931
§ 371 (c)(1),
(2) Date: Jan. 16, 2020

(87) PCT Pub. No.: WO2019/017229
PCT Pub. Date: Jan. 24, 2019

(65) Prior Publication Data
US 2020/0172044 A1 Jun. 4, 2020

(30) Foreign Application Priority Data
Jul. 20, 2017 (JP) .............................. JP2017-140938

(51) Int. Cl.
*B60R 21/264* (2006.01)
*B60R 21/26* (2011.01)
(Continued)

(52) U.S. Cl.
CPC ............. *B60R 21/2644* (2013.01); *B01J 7/00* (2013.01); *B60R 21/261* (2013.01);
(Continued)

(58) Field of Classification Search
CPC ...... B01J 7/00; B60R 21/2644; B60R 21/261; B60R 2021/26011; B60R 2021/26029;
(Continued)

(56) References Cited

U.S. PATENT DOCUMENTS

| 5,622,381 A | 4/1997 | Mossi et al. |
| 6,929,284 B1 | 8/2005 | Saso et al. |

(Continued)

FOREIGN PATENT DOCUMENTS

| JP | 3044097 U | 12/1997 |
| JP | 2000-296756 A | 10/2000 |
| JP | 2012-40943 A | 3/2012 |

OTHER PUBLICATIONS

International Search Report, dated Oct. 9, 2018, for International Application No. PCT/JP2018/025931, along with an English translation.

(Continued)

*Primary Examiner* — Ruth Ilan
*Assistant Examiner* — Daniel M. Keck
(74) *Attorney, Agent, or Firm* — Birch, Stewart, Kolasch & Birch, LLP

(57) ABSTRACT

A gas generator including an igniter, a combustion chamber, and a restriction part, the igniter including an accommodating chamber accommodating an explosive therein, an ignition portion provided in the accommodating chamber, and a separating part including a pressure receiving surface, the separating part being configured to be separable from the igniter and movable in a predetermined direction, the combustion chamber being configured to burn a gas generating agent filled outside the accommodating chamber, by the combustion of the explosive, the restriction part provided in a predetermined position in the predetermined direction from the igniter and restricting a movement of the separating (Continued)

part, and the separating part including a guide that directs the combustion product of the explosive by the pressure receiving surface toward the igniter, in a state where the movement of the separating part in the predetermined direction is restricted by the restriction part.

13 Claims, 13 Drawing Sheets

(51) Int. Cl.
    *B60R 21/263* (2011.01)
    *B01J 7/00* (2006.01)
    *B60R 21/261* (2011.01)

(52) U.S. Cl.
    CPC ............ *B60R 2021/26011* (2013.01); *B60R 2021/26029* (2013.01); *B60R 2021/2633* (2013.01); *B60R 2021/2642* (2013.01); *B60R 2021/2648* (2013.01); *B60R 2021/26076* (2013.01)

(58) Field of Classification Search
    CPC .. B60R 2021/26076; B60R 2021/2633; B60R 2021/2648
    See application file for complete search history.

(56) References Cited

U.S. PATENT DOCUMENTS

| | | | |
|---|---|---|---|
| 10,676,061 B2* | 6/2020 | Tanaka | B60R 21/264 |
| 2004/0046374 A1* | 3/2004 | Yamazaki | B60R 21/261 |
| | | | 280/741 |
| 2011/0221176 A1* | 9/2011 | Bierwirth | B60R 21/264 |
| | | | 280/741 |
| 2015/0217717 A1* | 8/2015 | Ohsugi | B60R 21/264 |
| | | | 102/530 |
| 2016/0052486 A1* | 2/2016 | Ohsugi | B60R 21/264 |
| | | | 102/530 |
| 2017/0166160 A1* | 6/2017 | Izuma | B60R 21/264 |
| 2017/0210332 A1* | 7/2017 | Jung | B28B 1/001 |
| 2019/0126886 A1* | 5/2019 | Ukita | B60R 21/261 |
| 2020/0039463 A1* | 2/2020 | Fukui | F42B 3/12 |
| 2020/0216011 A1* | 7/2020 | Yamamoto | B01J 7/00 |

OTHER PUBLICATIONS

Written Opinion of the International Searching Authority, dated Oct. 9, 2018. for Interational Application No. PCT/JP2018/025931, along with an English translation.

* cited by examiner

GAS GENERATOR

FIELD

The present invention relates to a gas generator configured to burn a gas generating agent by explosive combustion at an igniter, thereby generating combustion gas.

BACKGROUND

A gas generator configured to burn a gas generating agent by explosive combustion at an igniter is widely used as generator for supplying a power source for realizing a desired operation of generated combustion gas.

Such a gas generator can be utilized as a driving source for deploying an airbag of an airbag device mounted in an automobile or the like, for example. In such a gas generator, the gas generating agent needs to be burned as desired in order to generate combustion gas as designed.

For example, in the gas generator illustrated in Patent Document 1, as illustrated in FIG. 14 and FIG. 19, an igniter tip is covered by an ignition lid, and an igniting agent is burned in a space covered by the ignition lid. Further, an ignition hole configured to eject flame caused by the explosive combustion is formed in the ignition lid. This ignition hole is formed to eject flame toward an area around an axial center of a housing of the gas generator having a cylindrical shape. According to such a configuration, the flame caused by the explosive combustion is released toward the igniter, initiating combustion with the gas generating agent positioned around the axial center inside the housing of the gas generator.

CITATION LIST

Patent Document

[Patent Document 1] JP 2000-296756 A
[Patent Document 2] JP 3044097 UM-B

SUMMARY

Technical Problem

In order to burn the gas generating agent as desired, the release direction of a combustion product generated by explosive combustion needs to be the desired direction. Furthermore, in the gas generator in the related art, the combustion product is intended to be released laterally of an explosive accommodating space of the igniter in a radial pattern. With regard to the arrangement of the gas generating agent around the igniter in the combustion chamber, the gas generating agent may be disposed not only laterally of the explosive accommodating space but also below the space. Furthermore, in the related art in which the combustion product generated by explosive combustion is released laterally of the explosive accommodating space, it is not easy for combustion product to directly reach an area below the space. Thus, in the related art, there is a risk that the gas generating agent disposed around the igniter cannot be burned as desired.

In light of the problems described above, an object of the present invention is to provide a technique that makes it possible to properly burn a gas generating agent disposed around an igniter.

Solution to Problem

To solve the above-described problems, an igniter provided in a gas generator according to the present invention includes a separating part configured to be separable from the igniter and movable in a predetermined direction by an action of a combustion product generated by explosive combustion at the igniter. Furthermore, according to the present invention, the gas generator has a configuration such that, in a state where a movement of the separating part in the predetermined direction is restricted by a restriction part, a guide provided to the separating part directs a combustion product received by the separating part toward the igniter. According to such a configuration, it is possible to properly burn a gas generating agent disposed around an igniter.

Specifically, the gas generator according to the present invention includes the igniter, a combustion chamber, and the restriction part, the igniter including, an accommodating chamber accommodating an explosive therein, an ignition portion that is provided in the accommodating chamber and ignites an explosive, and a separating part that includes a pressure receiving surface that receives a combustion product generated by a combustion of the explosive at the igniter, the separating part being configured to be separable from the igniter and movable in a predetermined direction by an action of the combustion product on the pressure receiving surface, the combustion chamber being configured to burn a gas generating agent, which is filled outside the accommodating chamber, by the combustion of the explosive at the igniter, the combustion chamber being formed surrounding the igniter, the restriction part being provided in a predetermined position in the predetermined direction from the igniter disposed inside the combustion chamber, the restriction part restricting a movement of the separating part in the predetermined direction. Furthermore, the separating part further includes a guide that directs a combustion product received by the pressure receiving surface toward the igniter, in a state where the movement of the separating part in the predetermined direction is restricted by the restriction part.

The igniter described above includes the separating part that is integrated with the igniter before the combustion of the explosive and separates from the igniter after the combustion of the explosive. In the gas generator according to the present invention provided with such an igniter, the combustion product generated by the combustion of the explosive acts on the pressure receiving surface of the separating part. When this happens, the separating part is separated from the igniter. Here, the separating part is configured to be movable in the predetermined direction by the action of the combustion product on the pressure receiving surface. Accordingly, the separating part separated from the igniter moves in the combustion chamber formed surrounding the igniter in the predetermined direction from the igniter. Further, the restriction part is provided inside the combustion chamber in a predetermined position in the predetermined direction from the igniter. Accordingly, the separating part that moves inside the combustion chamber from the igniter in the predetermined direction comes into contact with the restriction part in the process of moving, and the movement is restricted.

Furthermore, in a state where the movement of the separating part in the predetermined direction is restricted by the restriction part, the combustion product reflected by the pressure receiving surface of the separating part is directed toward the igniter by the guide of the separating part and spreads throughout the combustion chamber. Furthermore, the combustion product thus spread throughout the combustion chamber burns the gas generating agent on the igniter side. That is, combustion of the gas generating agent disposed around the igniter is promoted. As a result, the gas generating agent disposed around the igniter can be properly burned, thus non-uniformity in combustion of the gas generating agent can be suppressed to the extent possible, and a proper combustion-gas-generating ability can be exhibited.

Further, in the gas generator according to the present invention, the igniter may further include a header provided with the ignition portion fixed thereto and an accommodating cup that is provided with a bottom surface disposed facing the ignition portion and with a peripheral wall connected to a peripheral edge of the bottom surface and disposed surrounding the ignition portion, the accommodating cup forming the accommodating chamber by the peripheral wall and the bottom surface. Furthermore, in the gas generator, the separating part may serve as the accommodating cup, an inner wall surface of the accommodating cup may serve as the pressure receiving surface, and the peripheral wall may, as the guide, direct the combustion product toward the header. According to such a configuration, the inner wall surface of the accommodating cup forming the accommodating chamber functions as the pressure receiving surface, and thus the combustion product generated by the combustion of the explosive can properly act on the pressure receiving surface. This makes it easier to separate the accommodating cup from the igniter. Furthermore, in a state where a movement of the accommodating cup in the predetermined direction is restricted by the restriction part, the peripheral wall of the accommodating cup, as the guide, directs the combustion product received by the pressure receiving surface toward the header of the igniter, and thus the gas generating agent disposed around the igniter is properly burned.

Here, in the gas generator described above, the accommodating cup may be fixed to the header before the combustion of the explosive at the igniter so as to be separable from the header side by the combustion of the explosive at the igniter. Furthermore, the gas generator may be configured such that, in a state where a movement of the accommodating cup separated in the predetermined direction by the combustion of the explosive at the igniter is restricted by the restriction part, an opening defined by a peripheral edge of the accommodating cup on the header side expands in diameter, and the peripheral wall including the opening expanded in diameter directs the combustion product toward the header.

According to such a configuration, when the combustion product generated by the combustion of the explosive acts on the pressure receiving surface of the accommodating cup, the fixed state of the accommodating cup and the header is no longer maintained. As a result, the accommodating cup separates from the header side and moves in the combustion chamber in the predetermined direction from the igniter. Then, in the process of moving, the accommodating cup comes into contact with the restriction part, and the movement is restricted. Here, in the gas generator described above, in a state where the movement of the accommodating cup separated from the header side is restricted, a state where the opening of the accommodating cup is expanded in diameter is formed. In such a state, the combustion product reflected by the pressure receiving surface of the accommodating cup is easily directed by the peripheral wall of the accommodating cup, across a wide range toward the header side of the combustion chamber. As a result, the combustion product released from the accommodating cup is guided across a wide range toward the header side of the combustion chamber, thereby promoting the combustion of the gas generating agent disposed around the igniter across even a wider range. That is, it is possible to properly burn a gas generating agent disposed around an igniter.

Furthermore, in the gas generator described above, the accommodating cup may include, in the peripheral wall, a first fragile part, which deforms due to the action of the combustion product, thereby causing the opening of the accommodating cup to expand in diameter. According to such a configuration, the peripheral wall including the first fragile part readily deforms in a direction in which the opening of the accommodating cup expands in diameter. This makes it easier to guide the combustion product across a wide range toward the header side of the combustion chamber. As a result, the combustion of the gas generating agent disposed around the igniter is promoted across a wide range, making it possible to properly burn the gas generating agent disposed around the igniter.

Further, in the gas generator described above, the accommodating cup may include, in the peripheral wall, a second fragile part, which breaks due to the action of the combustion product, thereby causing a portion of the accommodating cup to be separable from the header side. Furthermore, the gas generator may be configured such that the peripheral wall at a portion of the accommodating cup separated from the header side, by the breaking of the second fragile part by the combustion of the explosive at the igniter, directs the combustion product toward the header. According to such a configuration, when the combustion product generated by the combustion of the explosive acts on the pressure receiving surface of the accommodating cup, the second fragile part included in the peripheral wall breaks. When this happens, a portion of the accommodating cup is separated from the header side while being acted upon by the combustion product. Then, the portion of the accommodating cup separated from the header side moves in the combustion chamber in the predetermined direction from the igniter, and this movement is restricted by the restriction part. The peripheral wall of this portion of the accommodating cup directs the combustion product toward the header, making it possible to properly burn the gas generating agent disposed around the igniter.

Here, in the gas generator described above, the accommodating cup may be both fixed to the header and anchored to the header on a side of an opening defined by a peripheral edge of the accommodating cup on the header side of the peripheral wall and may further form the second fragile part in the peripheral wall near the bottom surface. Furthermore, the gas generator may be configured such that a portion of the peripheral wall and the bottom surface are integrally separated from the header side by the breaking of the second fragile part by the combustion of the explosive at the igniter. Such a gas generator may be configured by, for example, anchoring any portion of the peripheral wall of the accommodating cup, from the second fragile part to the opening, to the header by welding. Then, according to such a configuration, when the second fragile part included in the peripheral wall breaks by the action of the combustion product, a portion of the accommodating cup including the bottom surface and the peripheral wall near the bottom surface is separated from the header side. On the other hand, the other portion of the accommodating cup including the opening and the peripheral wall near the opening is maintained in an anchored state to the header. Then, the portion of the accommodating cup separated from the header side moves in the combustion chamber in the predetermined direction from the igniter, and this movement is restricted by the restriction part. The peripheral wall of this portion of the accommodating cup directs the combustion product toward the header, making it possible to properly burn the gas generating agent disposed around the igniter.

Further, in the gas generator according to the present invention, the igniter may further include a header provided with the ignition portion fixed thereto, and an accommodating cup provided with a bottom surface disposed facing the ignition portion and with a peripheral wall connected to a peripheral edge of the bottom surface and disposed surrounding the ignition portion, the accommodating cup forming the accommodating chamber by the peripheral wall and the bottom surface. In such a configuration, the accommodating cup may release the combustion product outside the accommodating chamber by a rupturing of a predetermined area, and the separating part may serve as an auxiliary cup that includes the pressure receiving surface that receives the combustion product released from the accommodating cup and that is provided covering the predetermined area of the accommodating cup. Furthermore, the gas generator may be configured such that, in a state where a movement of the auxiliary cup separated in the predetermined direction away from the accommodating cup by the combustion of the explosive at the igniter is restricted by the restriction part, a portion of the auxiliary cup, as the guide, directs the combustion product toward the igniter.

According to such a configuration, when a predetermined area of the accommodating cup ruptures by the combustion of the explosive and the combustion product is released outside the accommodating chamber, the combustion product acts on the pressure receiving surface of the auxiliary cup. When this happens, the auxiliary cup separates in a predetermined direction away from the accommodating cup. Furthermore, in a state where the movement of the auxiliary cup in the predetermined direction is restricted by the restriction part, the combustion product is directed toward the igniter by a portion of the auxiliary cup and spreads throughout the combustion chamber. As a result, the combustion of the gas generating agent disposed around the igniter is promoted, making it possible to properly burn the gas generating agent disposed around the igniter.

The gas generator described above may further include a housing that houses the igniter and is provided with the combustion chamber in the interior thereof. In such a configuration, the housing may be further provided with, in the interior thereof, a divider wall that vertically divides the combustion chamber and that forms a first combustion chamber positioned on an upper side thereof and a second combustion chamber positioned on a lower side thereof and on a bottom surface of the housing, a first igniter for burning a first gas generating agent filled in the first combustion chamber and a second igniter for burning a second gas generating agent filled in the second combustion chamber. The divider wall may include an accommodating wall that surrounds the first igniter disposed on the bottom surface and that accommodates the first igniter inside the first combustion chamber, the second igniter may include the separating part, the restriction part may serve as a portion of the divider wall positioned inside the second combustion chamber in the predetermined direction from the second igniter, and the guide of the separating part may direct the combustion product toward the second igniter in a state where the movement of the separating part in the predetermined direction is restricted by a portion of the divider wall.

With such a gas generator, the form of release of the combustion gas to the outside can be variously adjusted according to the combustion of the first gas generating agent by actuation of the first igniter; and the combustion of the second gas generating agent by actuation of the second igniter. Further, such a gas generator can also generate and release a relatively large amount of combustion gas to the outside. Furthermore, with regard to a positional relationship between the igniters and the gas generating agent in this gas generator, in the first combustion chamber positioned on the upper side in the housing interior, the first gas generating agent tends to be filled above the first igniter disposed on the bottom surface of the housing. In contrast, in the second combustion chamber positioned on the lower side in the housing interior, the second gas generating agent tends to be filled laterally of the second igniter disposed on the bottom surface of the housing. In this case, a relatively large amount of the second gas generating agent is readily filled on the bottom surface side of the housing around the second igniter in the second combustion chamber. Here, in the gas generator described above, in a state where the movement of the separating part is restricted by a portion of the divider wall, the combustion product reflected by the pressure receiving surface of the separating part is directed toward the second igniter (that is, the bottom surface of the housing) by the guide of the separating part and spreads throughout the second combustion chamber. As a result, even when a relatively large amount of the second gas generating agent is filled into the bottom surface side of the housing around the second igniter, the second gas generating agent can be properly burned. Thus, non-uniformity in combustion of the gas generating agent can be suppressed to the extent possible, and a proper combustion-gas-generating ability can be exhibited.

Advantageous Effects of Invention

According to the present invention, it is possible to properly burn a gas generating agent disposed around an igniter.

DESCRIPTION OF EMBODIMENTS

A gas generator according to an embodiment of the present invention will be described below with reference to the drawings. Note that configurations of the following embodiment are provided as examples, and the present invention is not limited to the configurations of the embodiment.

EXAMPLE 1

Figure 1:
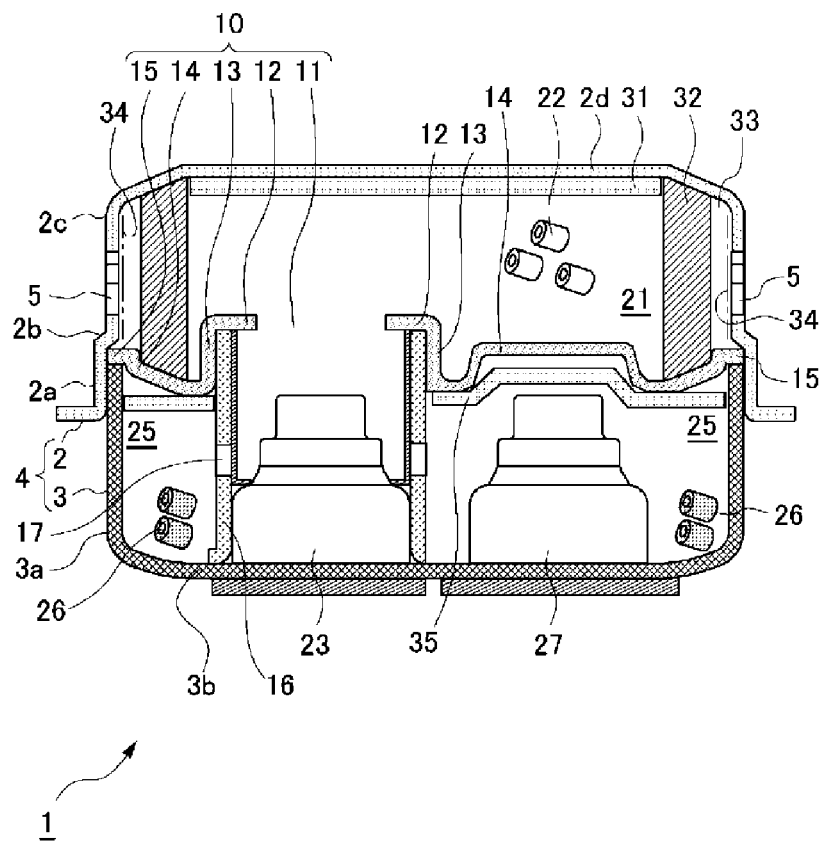
FIG. 1 is a first schematic representation of a configuration of a gas generator according to an embodiment of the present invention.

FIG. 1 is a cross-sectional view in a height direction of a gas generator 1. The gas generator 1 is configured to burn a gas generating agent, with which a housing 4 formed by an upper shell 2 and a lower shell 3 is filled, and to release a combustion gas. Note that the gas generator 1 is a so-called dual-type gas generator including two combustion chambers disposed on the upper side and lower side, respectively, and each of the two combustion chambers includes an igniter and a gas generating agent that correspond to each of the combustion chambers, as described below. Here, the upper shell 2 includes a peripheral wall 2c and a top surface 2d which form a recessed internal space. The top surface 2d and a bottom surface 3b of the lower shell 3 described below are substantially circular when viewed from above. The peripheral wall 2c and a peripheral wall 3a of the lower shell 3 described below surround the top surface 2d and the bottom surface 3b, respectively, and extend substantially perpendicularly from the corresponding surfaces to form annular wall surfaces. The internal space of the upper shell 2 is a first combustion chamber 21 filled with a first gas generating agent 22, as described below. The top surface 2d is connected to one end of the peripheral wall 2c, and the other end of the peripheral wall 2c serves as an opening of the upper shell 2. Further, on the other end side of the peripheral wall 2c, a mating wall 2a and an abutting portion 2b are provided in this order from the opening. The radius of the internal space formed by the mating wall 2a is larger than the radius of the internal space formed by the peripheral wall 2c on a side nearer to the top surface 2d, and the mating wall 2a connects to the peripheral wall 2c, with the abutting portion 2b interposed therebetween.

Furthermore, the lower shell 3 includes the peripheral wall 3a and the bottom surface 3b which form a recessed internal space. The internal space is a second combustion chamber 25 filled with a second gas generating agent 26, as described below. The bottom surface 3b is connected to one end of the peripheral wall 3a, and the other end of the peripheral wall 3a serves as an opening of the lower shell 3. The radius of the internal space formed by the peripheral wall 3a is substantially the same as the radius of the internal space formed by the peripheral wall 2c of the upper shell 2.

The bottom surface 3b of the lower shell 3 is provided with holes in which a first igniter 23 and a second igniter 27 are fixed, respectively.

Further, in the housing 4, a divider wall 10 is disposed between the upper shell 2 and the lower shell 3. The divider wall 10 includes a terminating end 15, a dividing wall 14 connected to the terminating end 15 and generally dividing the inside of the housing 4 into upper and lower spaces, a peripheral wall 13 connected to the dividing wall 14 and extending along an accommodating wall member (accommodating wall) 16 described below, and an end 12 disposed partially covering the opening of the accommodating wall member 16. Note that the end 12 forms a through hole 11. Further, the accommodating wall member 16, which has a tubular shape, is provided on the bottom surface 3b and surrounds the periphery of the first igniter 23, in the height direction thereof, attached to the bottom surface 3b of the lower shell 3. An opening above the accommodating wall member 16 is covered by the end 12 of the divider wall 10. In addition, a through hole 17 is provided in the accommodating wall member 16, and the through hole 17 allows communication between two spaces (the first combustion chamber 21 and a second combustion chamber 25) resulting from division by the divider wall 10.

In a state where the divider wall 10 is attached on the lower shell 3 in the above-described manner, the upper shell 2 is further attached from above. As described above, since the radius of the internal space formed by the mating wall 2a of the upper shell 2 is larger than the radius of the internal space formed by the peripheral wall 2c, the upper shell 2 is mated with the lower shell 3, and thus the abutting portion 2b is abutted on the terminating end 15 of the divider wall 10. Note that, in the housing 4, at a site of mating or contact between the upper shell 2 and the lower shell 3, the upper shell 2 and the lower shell 3 are joined by any joining method (for example, welding) suitable in terms of moisture prevention, etc. for the gas generating agent filled in the housing 4.

As described above, the internal space of the housing 4 is substantially divided, by the divider wall 10, into two spaces positioned on the upper side and the lower side, respectively. With regard to the internal space of the housing 4, the first igniter 23 and the first gas generating agent 22 are disposed in the first combustion chamber 21 defined by the upper shell 2 and the divider wall 10, and the second igniter 27 and the second gas generating agent 26 are disposed in the second combustion chamber 25 defined by the lower shell 3 and the divider wall 10. In this way, the gas generator 1 is configured as a dual-type gas generator including two igniters, i.e., the first igniter 23 and the second igniter 27. Note that the first igniter 23 and the second igniter 27 are both fixed on the bottom surface 3b of the lower shell 3, and thus the first igniter 23 is housed in a state in which the side of the first igniter 23 is surrounded by the accommodating wall member 16.

Here, in the first combustion chamber 21, while the first igniter 23 is accommodated in the space defined by the internal space of the accommodating wall member 16 (the space defined by the accommodating wall member 16 and the bottom surface 3b of the lower shell 3 and opening upward) and the upper space is filled with the first gas generating agent 22, a filter 32 having an annular shape is disposed surrounding the first gas generating agent 22. At this time, the first gas generating agent 22 is filled in a state of being pressed, by a biasing force applied by a cushion 31, against the filter 32, the dividing wall 14, and the like, and thus undesired vibration of the first gas generating agent 22 in the first combustion chamber 21 does not occur. The first gas generating agent 22 used is a gas generating agent having a relatively low combustion temperature. It is preferable that the first gas generating agent 22 has a combustion temperature in the range of 1000 to 1700° C. As the first gas generating agent 22, a single hole cylindrical gas generating agent including guanidine nitrate (41 wt. %), basic copper nitrate (49 wt. %), and a binder or an additive, for example, may be used. Note that the internal space of the accommodating wall member 16 may be filled with a gas generating agent having a different composition from that of the first gas generating agent 22. In this case, the composition of the gas generating agent filled in the internal space of the accommodating wall member 16 can be configured with the combustion temperature higher than the combustion temperature of the first gas generating agent 22 to promote ignition of the first gas generating agent 22.

The filter 32 is configured by stacking flat woven meshes made of stainless steel in the radial direction and compressing the meshes in the radial and axial directions. The filter 32 is configured to cool the combustion gas from the first gas generating agent 22 and collect combustion residue included in the combustion gas. Alternatively, a filter having a wire wound type structure, in which a wire is wound forming multiple layers on a core rod, may be used as the filter 32. Note that the filter 32 also collects the combustion residue of the second gas generating agent 26 filled in the second combustion chamber 25. In addition, a gap 33 formed between the peripheral wall 2c of the upper shell 2 and the filter 32 forms a gas passage that surrounds the filter 32 and has an annular shape in the radial direction in cross sectional view. The gap 33 allows the combustion gas to pass through the entire area of the filter 32, and thus it is possible to achieve effective utilization of the filter 32 and effective cooling and purification of the combustion gas. The combustion gas flowing through the gap 33 reaches a gas discharge port 5 provided in the peripheral wall 2c. In addition, to prevent moisture from entering the housing 4 from outside, the gas discharge port 5 is closed, by an aluminum tape 34, from the inside of the housing 4 until the gas generator 1 is actuated.

Further, the second combustion chamber 25 is filled with the second gas generating agent 26 correspondingly to the second igniter 27 fixed to the bottom surface 3b of the lower shell 3. In this case, a relatively large amount of the second gas generating agent 26 is readily filled on the bottom surface 3b side of the lower shell 3 surrounding the second igniter 27 in the second combustion chamber 25. Further, the second gas generating agent 26 is also filled in a state of being biased by a cushion 35, and thus undesired vibration of the second gas generating agent 26 in the second combustion chamber 25 does not occur. Further, similar to the first gas generating agent 22, for the second gas generating agent 26 as well, a single hole cylindrical gas generating agent including guanidine nitrate (41 wt. %), basic copper nitrate (49 wt. %), and a binder or an additive may be used.

With such a configuration, in the gas generator 1, the form of release of the combustion gas to the outside can be variously adjusted by the combustion of the first gas generating agent 22 caused by actuation of the first igniter 23; and combustion of the second gas generating agent 26 caused by actuation of the second igniter 27. Further, a relatively large amount of combustion gas can be generated and released to the outside.

Figure 2:
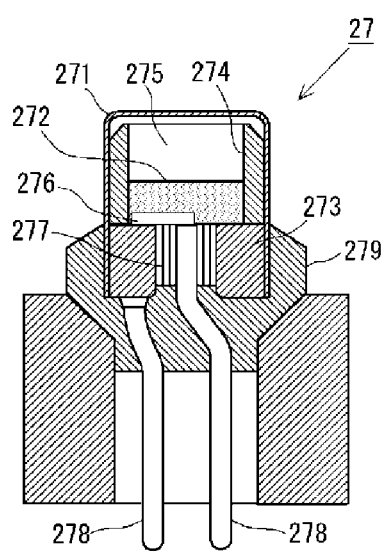
FIG. 2 is a schematic representation of a configuration of an igniter applied to the gas generator illustrated in FIG. 1.
Figure 3:
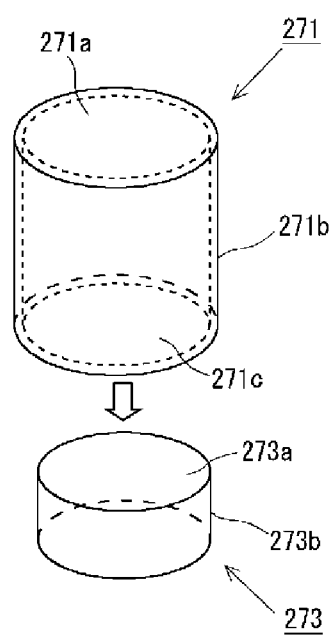
FIG. 3 is a schematic representation of a configuration of an accommodating cup and a metal header applied to the igniter illustrated in FIG. 2.

Next, an igniter applied to the gas generator 1 will be described on the basis of FIG. 2 and FIG. 3, using the second igniter 27 as an example. The second igniter 27 is an electrical ignition device. As illustrated in FIG. 2, a space for accommodating an ignition charge 272 inside is defined by an accommodating cup 271 made of a metal, the surface of which is covered by an insulating cover. Further, a metal header 273 is disposed in the space, and a charge holder 274 having a tubular shape is provided on the upper surface thereof. The ignition charge 272 is held by the charge holder 274. Here, as illustrated in FIG. 3, the accommodating cup 271 includes a bottom surface 271a, a peripheral wall 271b, and an opening 271c. Further, the bottom surface 271a and the peripheral wall 271b of the accommodating cup 271 cover an upper surface 273a and a peripheral surface 273b of the metal header 273, and the accommodating cup 271 and the metal header 273 are fixed, thereby forming an accommodating chamber 275. The ignition charge 272 is sealed to this accommodating chamber 275. Further, a bridge wire 276 electrically connecting one of conductive pins 278 and the metal header 273 is wired to the bottom of the ignition charge 272 accommodated in the accommodating chamber 275. Note that the two conductive pins 278 are fixed to the metal header 273 with an insulator 277 interposed therebetween, and thus the two conductive pins 278 are in an insulated state during non-voltage application. Furthermore, the opening 271c defined by a peripheral edge of the accommodating cup 271 on the metal header 273 side is protected in a state where the insulating properties between the conductive pins 278 are properly maintained by a resin collar 279. In the second igniter 27 thus configured, when a voltage is applied between the two conductive pins 278 by an external power supply, current flows to the bridge wire 276, which burns the ignition charge 272. Note that the bridge wire 276 that burns the ignition charge 272 corresponds to the ignition portion of the present invention.

Examples of the ignition charge used in the igniter applied to the gas generator 1 include an explosive containing zirconium and potassium perchlorate (ZPP), an explosive containing titanium hydride and potassium perchlorate (THPP), an explosive containing titanium and potassium perchlorate (TiPP), an explosive containing aluminum and potassium perchlorate (APP), an explosive containing aluminum and bismuth oxide (ABO), an explosive containing aluminum and molybdenum oxide (AMO), an explosive containing aluminum and copper oxide (ACO), an explosive containing aluminum and iron oxide (AFO), or an explosive composed of a combination of a plurality of the explosives thereof. These explosives exhibit characteristics that, although the explosives generate high-temperature and high-pressure plasma during combustion immediately after ignition, when the combustion product condenses at room temperature, the explosives do not contain gaseous components and that the pressure generated decreases abruptly. Note that an explosive other than these may be used as the ignition charge.

Then, when the ignition charge 272 burns, a combustion product is generated. When this happens, the combustion product is ejected from the charge holder 274. At this time, the combustion product ejected from an upper end of the charge holder 274 tends to act mainly on the inner wall surface of the bottom surface 271a of the accommodating cup 271 provided facing the upper end of the charge holder 274.

Figure 4A:
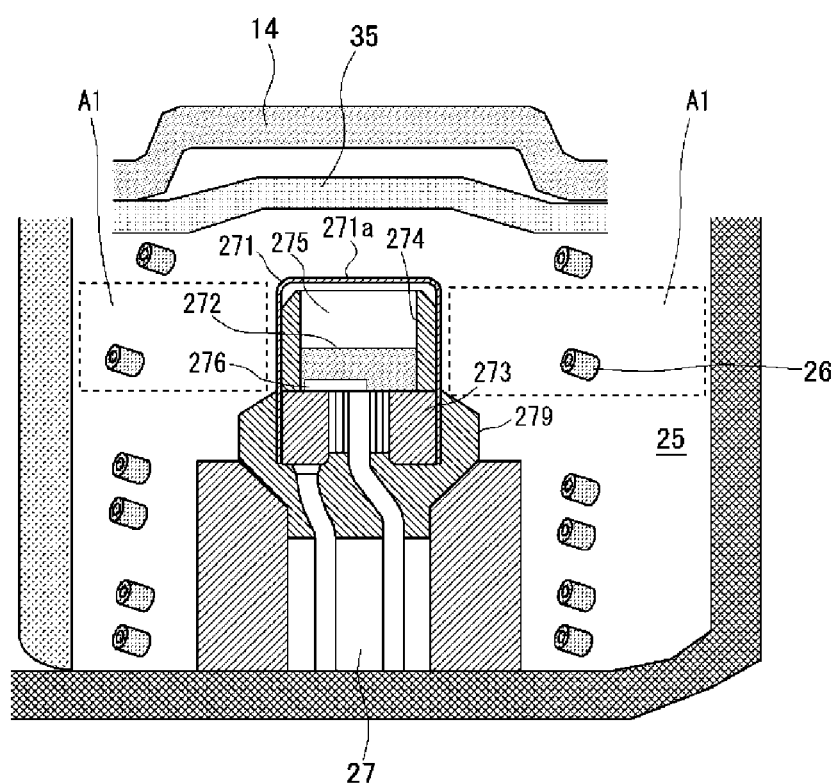
FIG. 4A is a schematic representation of a configuration of a second igniter and a vicinity thereof in the gas generator illustrated in FIG. 1, illustrating a state before combustion of an ignition charge.

Here, as illustrated in FIG. 4A, a combustion chamber space (second combustion chamber 25) is provided laterally of (range A1 in FIG. 4A), above (a range above the range A1 in FIG. 4A), below (a range below the range A1 in FIG. 4A), and outside the accommodating chamber 275 of the second igniter 27, and the second gas generating agent 26 is filled in the space. Given that the combustion product is released from the accommodating chamber 275 into the second combustion chamber 25 by the rupturing of a predetermined area of the bottom surface 271*a* of the accommodating cup 271, combustion of the second gas generating agent 26 filled in the second combustion chamber 25 above, outside the accommodating chamber 275, is readily promoted. In this case, the combustion of the second gas generating agent 26 filled in the second combustion chamber 25 laterally of, below, and outside the accommodating chamber 275 is delayed, resulting in a risk that non-uniformity may occur in the combustion of the gas generating agent.

Here, in the gas generator 1 according to the present invention, the accommodating cup 271 of the second igniter 27 separates from the second igniter 27 and moves in a predetermined direction by an action of the combustion product generated by combustion of the ignition charge 272. In a state where the movement of the accommodating cup 271 is restricted by a cushion 35 and the dividing wall 14, the combustion product received by the accommodating cup 271 is directed toward the second igniter 27 (that is, toward the bottom surface 3*b* of the lower shell 3) by the peripheral wall 271*b* of the accommodating cup 271. As a result, the combustion of the second gas generating agent 26 laterally of, below, and outside the accommodating chamber 275 is promoted. This will be described in detail below.

As described above, the combustion product generated by the combustion of the ignition charge 272 is ejected from an upper end of the charge holder 274. The combustion product ejected from the charge holder 274 acts on the inner wall surface of the accommodating cup 271. As a result, the fixed state of the accommodating cup 271 and the metal header 273 is no longer maintained, and the accommodating cup 271 separates from the metal header 273 side. Note that the accommodating cup 271 is fixed to the metal header 273 before combustion of the ignition charge 272 and, by combustion of the ignition charge 272, is separable from the metal header 273 side. Such a fixed state is achieved by not fixing the accommodating cup 271 to the metal header 273 by welding. In this case, the accommodating cup 271 is fixed to the metal header 273, for example, by molding with the resin collar 279. Alternatively, the accommodating cup 271 may be fixed to the metal header 273 by forming a depression in the peripheral surface 273*b* of the metal header 273 and lightly crimping a portion of the peripheral wall 271*b* of the accommodating cup 271 corresponding to the depression; or by injecting a resin around the accommodating cup 271 and pressing the peripheral wall 271*b* of the accommodating cup 271 against the peripheral surface 273*b* of the metal header 273 using shrinkage during curing. Note that, in this case, a sealing agent can be applied to the peripheral wall 271*b* of the accommodating cup 271 and the peripheral surface 273*b* of the metal header 273.

Then, even after the accommodating cup 271 has been separated from the metal header 273 side, the combustion product generated by the combustion of the ignition charge 272 continues to act on the inner wall surface of the accommodating cup 271. As a result, the accommodating cup 271 separates from the metal header 273 side moves in a predetermined direction from the second igniter 27 in the second combustion chamber 25. Here, the predetermined direction in the present example is a direction perpendicular to the bottom surface 271*a* of the accommodating cup 271. Furthermore, in the gas generator 1, the cushion 35 and the dividing wall 14 are provided in the predetermined direction from the second igniter 27. Thus, the accommodating cup 271 moving as described above comes into contact with the cushion 35 in the process of moving. Then, the accommodating cup 271 in contact with the cushion 35 continues to move in the predetermined direction while deforming the cushion 35 and is ultimately received by the dividing wall 14 with the cushion 35 interposed therebetween. That is, the accommodating cup 271 is restricted in movement by the cushion 35 and the dividing wall 14, and the cushion 35 and the dividing wall 14 correspond to the restriction part in the present invention. Note that, preferably, the second gas generating agent 26 is not present above the bottom surface 271*a* of the accommodating cup 271 in the second combustion chamber 25 in the state before the accommodating cup 271 is separated from the metal header 273, and thus the movement space of the accommodating cup 271 separated from the metal header 273 side is properly secured. However, even in a case that the second gas generating agent 26 is present, a small opening is formed in the bottom surface 271*a* of the accommodating cup 271, and the second gas generating agent 26 above the bottom surface 271*a* is preferentially burned when the second igniter 27 is actuated, making it possible to properly secure the movement space of the accommodating cup 271 separated from the metal header 273 side.

Figure 4B:
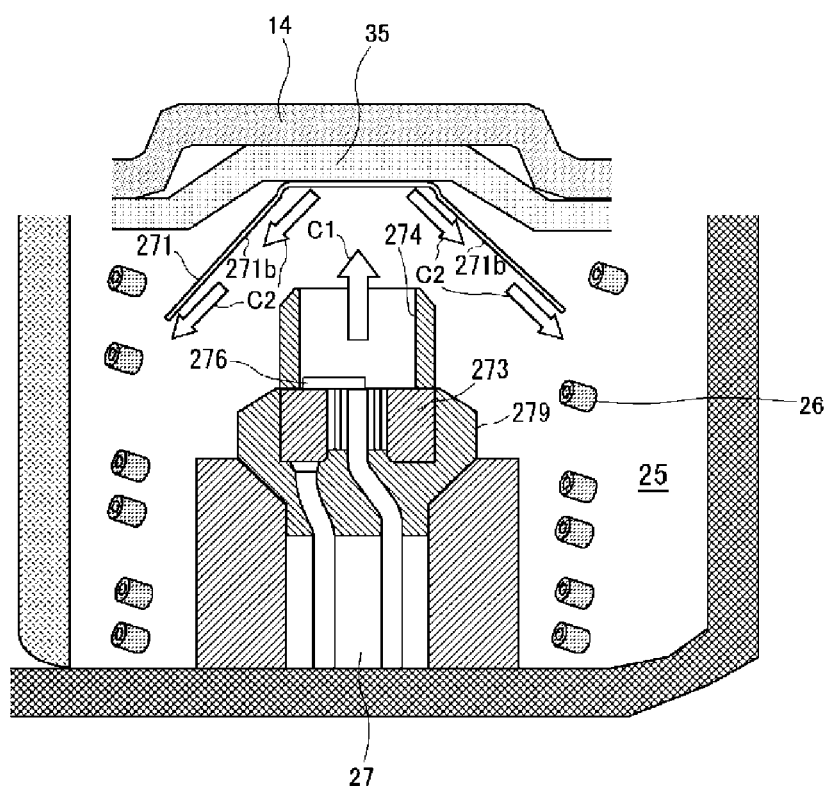
FIG. 4B is a schematic representation of a configuration of the second igniter and the vicinity thereof in the gas generator illustrated in FIG. 1, illustrating a state after combustion of the ignition charge.

Here, the spread of the combustion product into the second combustion chamber 25 in a state where a movement of the accommodating cup 271 separated from the metal header 273 side is restricted will be described on the basis of FIG. 4B. As illustrated in FIG. 4B, the accommodating cup 271 is received by the dividing wall 14 with the cushion 35 interposed therebetween. Furthermore, in such a state, a state in which the opening 271*c* of the accommodating cup 271 is expanded in diameter is further formed. This state is formed by the accommodating cup 271 being separated from the metal header 273 side and the metal forming the accommodating cup 271 elastically or plastically deforming. The spread of the combustion product to the second combustion chamber 25 at this time will be described in detail below.

As described above, the combustion product generated by the combustion of the ignition charge 272 is ejected from the upper end of the charge holder 274 (this is represented by arrow C1 in FIG. 4B). This combustion product acts on the inner wall surface of the accommodating cup 271, is reflected by the inner wall surface, and spreads into the second combustion chamber 25. Here, the flow of the combustion product reflected by the inner wall surface of the accommodating cup 271 is guided by the peripheral wall 271*b* (this is represented by arrow C2 in FIG. 4B). As a result, as indicated by the arrow C2 in FIG. 4B, the combustion product is directed toward the metal header 273 (second igniter 27). Furthermore, at this time, a state where the opening 271*c* of the accommodating cup 271 is expanded in diameter is formed, and thus the combustion product is guided across a wide range toward the metal header 273 (second igniter 27). As a result, the combustion of the second gas generating agent 26 disposed around the second igniter 27 can be promoted across a wide range. Note that the upper end of the charge holder 274 is positioned in a space relatively upward in the second combustion chamber 25, while a space near the bottom surface 3*b* of the lower shell 3 in the second combustion chamber 25 is the lowermost space in the second combustion chamber 25. Thus, assuming that there is no guiding function of the accommodating cup 271 such as described above, the combustion product does not readily reach the space near the bottom surface 3*b* directly. On the other hand, in the present example, the combustion product can be directly delivered to the space of the second combustion chamber 25 near the bottom surface 3*b* by the guiding function of the accommodating cup 271 described above, and thus ignition of the second gas generating agent 26 near the bottom surface 3*b* is readily performed. Note that, in the second igniter 27, the ignition charge 272 may be sealed in the accommodating chamber 275 and not held by the charge holder 274, and in this case, the charge holder 274 need not be provided to the second igniter 27.

According to the gas generator according to the present invention described above, the gas generating agent disposed around the igniter can be properly burned, thus non-uniformity in combustion of the gas generating agent can be suppressed to the extent possible, and a proper combustion-gas-generating ability can be exhibited.

FIRST MODIFIED EXAMPLE OF EXAMPLE 1

Figure 5:
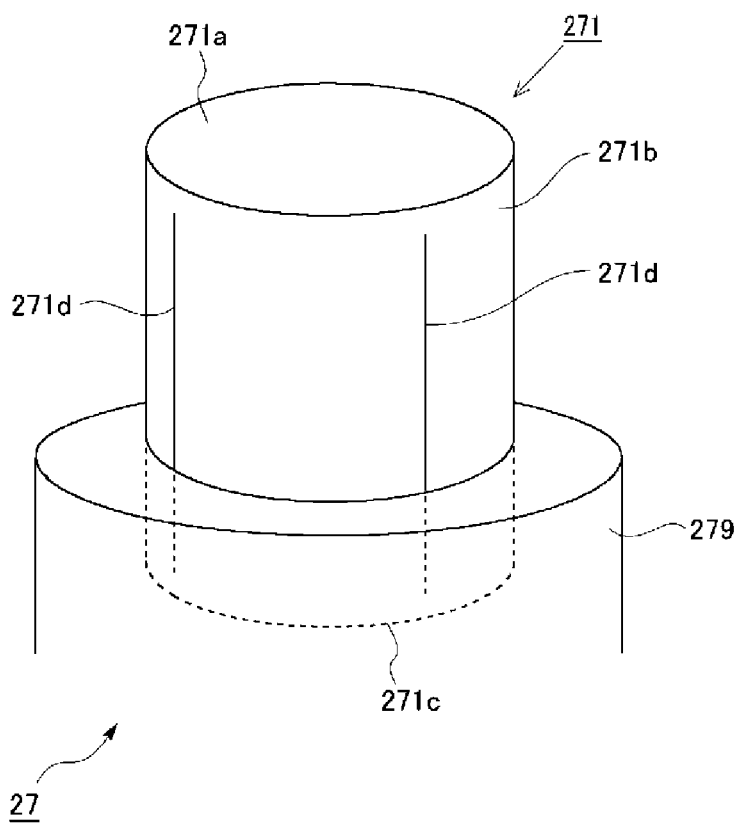
FIG. 5 is schematic representation of a configuration of an accommodating cup according to a first modified example of example 1 of the present invention.

Next, a first modified example of example 1 described above will be described on the basis of FIG. 5. Note that, in the present modified example, detailed descriptions of components substantially the same as those of example 1 described above are omitted. FIG. 5 is schematic representation of a configuration of the accommodating cup 271 according to the present modified example.

As illustrated in FIG. 5, the accommodating cup 271 according to the present modified example includes a thinned part 271*d* in the peripheral wall 271*b*. The thinned part 271*d* extends in the height direction of the peripheral wall 271*b*, is formed thinner in thickness compared to the other areas of the peripheral wall 271*b* and has a relatively fragile configuration. Note that the thinned part 271*d* corresponds to the first fragile part in the present invention. According to such a configuration, when the combustion product generated by the combustion of the ignition charge 272 acts on the inner wall surface of the accommodating cup 271, the peripheral wall 271*b* ruptures along the thinned part 271*d*. As a result, a state in which the opening 271*c* of the accommodating cup 271 is expanded in diameter is readily formed. This makes it easier to guide the combustion product across a wide range toward the metal header 273 (second igniter 27).

SECOND MODIFIED EXAMPLE OF EXAMPLE 1

Next, a second modified example of example 1 described above will be described on the basis of FIG. 6. Note that, in the present modified example, detailed descriptions of components substantially the same as those of example 1 described above are omitted. While the gas generator in example 1 described above is a dual-type gas generator 1 such as illustrated in FIG. 1, the gas generator to which the present invention is applied is not limited to such a type of gas generator. The present invention can also be applied to a gas generator 100 of a single type as illustrated in FIG. 6, for example.

Figure 6:
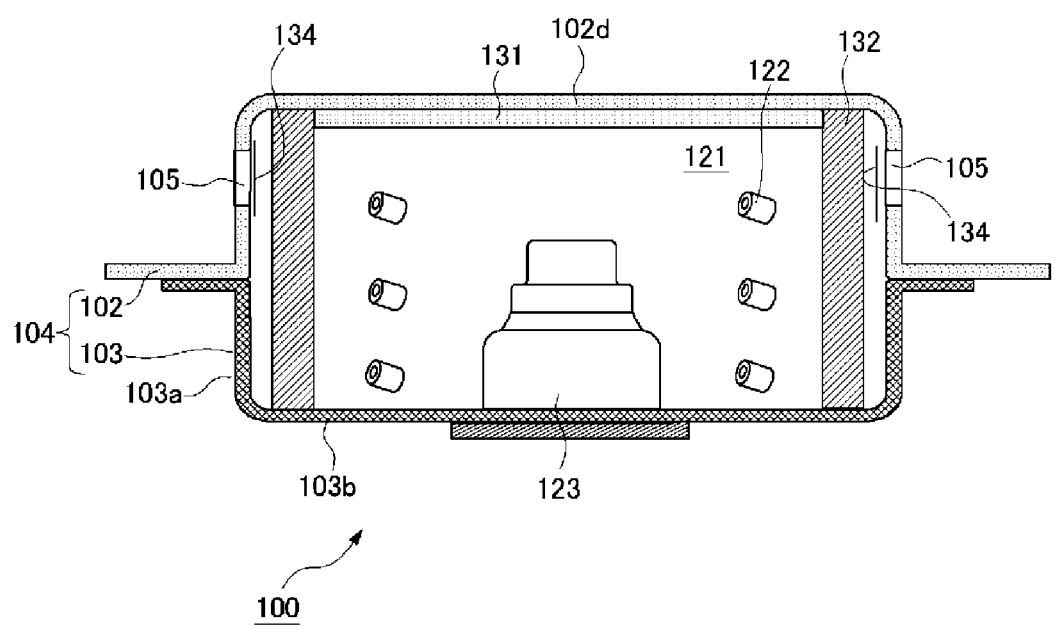
FIG. 6 is a second schematic representation of a configuration of a gas generator according to the embodiment of the present invention.

In the gas generator 100 illustrated in FIG. 6, of an upper shell 102 and a lower shell 103 forming a housing 104, an igniter 123 is fixed to a bottom surface 103*b* of the lower shell 103. Then, in a combustion chamber 121 formed surrounding the igniter 123, a gas generating agent 122 is burned. The combustion gas from the gas generating agent 122 passes through a filter 132 disposed surrounding the gas generating agent 122 and reaches a gas discharge port 105. Note that, similar to the gas generator 1 illustrated in FIG. 1 described above, the gas discharge port 105 is closed from the interior of the housing 104 by an aluminum tape 134.

Further, the igniter 123 applied to the gas generator 100 is as described in the explanations for FIGS. 2 and 3 above.

In such gas generator 100 as well, similar to the gas generator 1 illustrated in FIG. 1 described above, the accommodating cup of the igniter 123 separates from the igniter 123 and moves in the predetermined direction by the action of the combustion product generated by combustion of the ignition charge. The movement of the accommodating cup is then restricted by a cushion 131 and a top surface 102*d* of the upper shell 102. In a state where the movement of the accommodating cup is thus restricted, the combustion product received by the accommodating cup is directed toward the igniter 123 by the peripheral wall of the accommodating cup. As a result, the combustion of the gas generating agent 122 laterally of, below, and outside the accommodating chamber of the igniter 123 is promoted. Note that the cushion 131 and the top surface 102*d* of the upper shell 102 correspond to the restriction part of the present invention. In addition, in the gas generator 100, similar to the gas generator 1 illustrated in FIG. 1 described above, a small opening may be formed in the bottom surface of the accommodating cup, for example, and the gas generating agent 122 present between the bottom surface of the accommodating cup of the igniter 123 and the cushion 131 may be preferentially burned using the combustion product ejected from the opening. As a result, the movement space of the accommodating cup separated from the metal header side can be properly secured.

EXAMPLE 2

Figure 7:
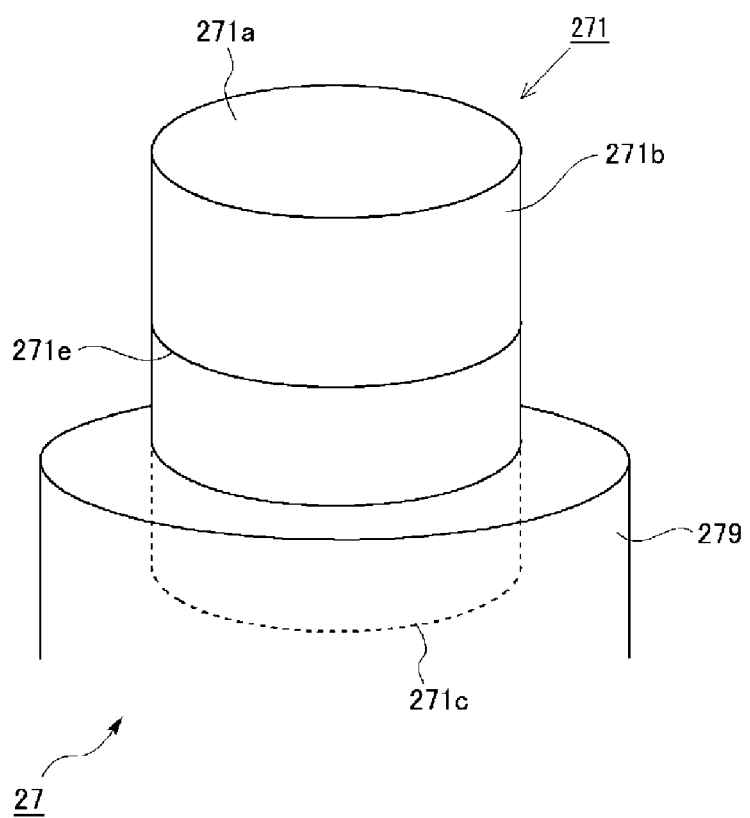
FIG. 7 is schematic representation of a configuration of an accommodating cup according to example 2 of the present invention.
Figure 8:
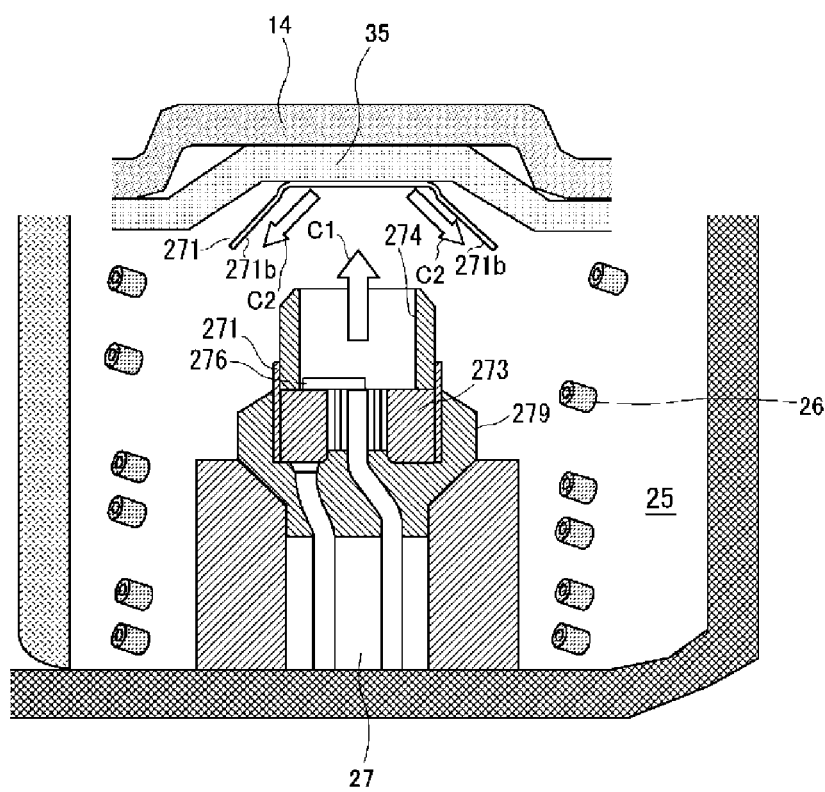
FIG. 8 is a schematic representation of a configuration of a second igniter and a vicinity thereof in the gas generator according to example 2 of the present invention, illustrating a state after combustion of an ignition charge.

Next, a second example of the present invention will be described on the basis of FIGS. 7 and 8. Note that, in the present example, detailed descriptions of components substantially the same as those of example 1 described above are omitted. FIG. 7 is schematic representation of a configuration of the accommodating cup 271 according to the present example.

As illustrated in FIG. 7, the accommodating cup 271 according to the present example includes a thinned part 271*e* on the peripheral wall 271*b*. The thinned part 271*e* extends in the circumferential direction of the peripheral wall 271*b*, is formed thinner in thickness compared to the other areas of the peripheral wall 271*b*, and has a relatively fragile configuration. Note that the thinned part 271*e* corresponds to the second fragile part in the present invention. Here, the accommodating cup 271 according to the present example is anchored to the metal header 273 on the side of the opening 271*c* of the peripheral wall 271*b*. The thinned part 271*e* is formed in the peripheral wall 271*b* closer to the bottom surface 271*a* than the anchored portion. Note that the accommodating cup 271 is anchored to the metal header 273, for example, by welding the accommodating cup 271 and the metal header 273.

When the combustion product generated by combustion of the ignition charge 272 at the second igniter 27 including such accommodating cup 271 acts on the inner wall surface of the accommodating cup 271, the thinned part 271*e* included in the peripheral wall 271*b* breaks. When this happens, a portion of the peripheral wall 271*b* and the bottom surface 271*a* are integrally separated from the metal header 273 side. Note that another portion of the peripheral wall 271*b*, which is a portion of the peripheral wall 271*b* on the opening 271*c* side, remains anchored to the metal header 273. Then, the accommodating cup described above separated from the metal header 273 side moves in the predetermined direction from the second igniter 27 in the second combustion chamber 25 and, as illustrated in FIG. 8, is received by the dividing wall 14 with the cushion 35 interposed therebetween. Furthermore, in the accommodating cup 271 received by the dividing wall 14, a state in which the peripheral edge on the metal header 273 side is expanded in diameter is formed. This state, similar to example 1 described above, is formed by the metal forming the accommodating cup 271 separated from the metal header 273 side being elastically or plastically deformed. At this time, the flow of the combustion product reflected by the inner wall surface of the accommodating cup 271 separated from the metal header 273 side is guided by the peripheral wall part 271*b* that broke (this is represented by arrow C2 in FIG. 8). As a result, as indicated by the arrow C2 in FIG. 8, the combustion product is directed toward the metal header 273 (second igniter 27). Then, the combustion product thus directed is guided across a wide range toward the metal header 273 (second igniter 27). As a result, the combustion of the second gas generating agent 26 disposed around the second igniter 27 can be promoted across a wide range.

EXAMPLE 3

Figure 9:
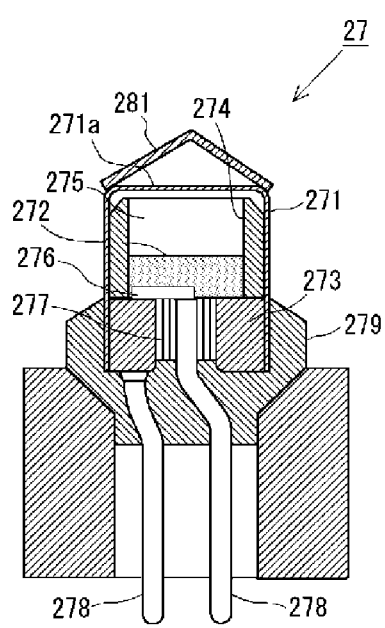
FIG. 9 is a schematic representation of a configuration of an igniter applied to a gas generator according to example 3 of the present invention.
Figure 10:
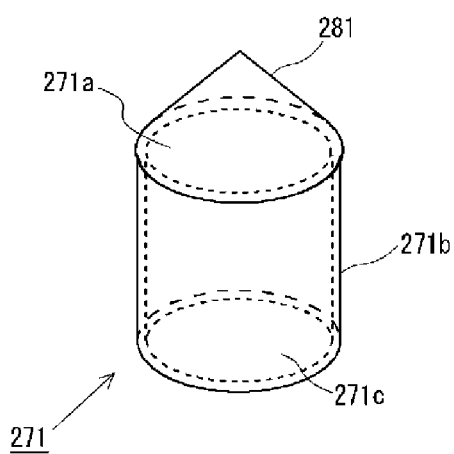
FIG. 10 is a schematic representation of a configuration of an auxiliary cup applied to the igniter illustrated in FIG. 9.

Next, a third example of the present invention will be described on the basis of FIGS. 9 to 11B. Note that, in the present example, detailed descriptions of components substantially the same as those of example 1 described above are omitted. FIG. 9 is schematic representation of a configuration of the igniter according to the present example. In the present example, the second igniter 27 in the gas generator 1 illustrated in FIG. 1 described above will be described as an example. In the second igniter 27 according to the present example, as illustrated in FIG. 9, an auxiliary cup 281 is provided covering the bottom surface 271*a* of the accommodating cup 271. This auxiliary cup 281 is a conical cup, as illustrated in FIG. 10.

Figure 11A:
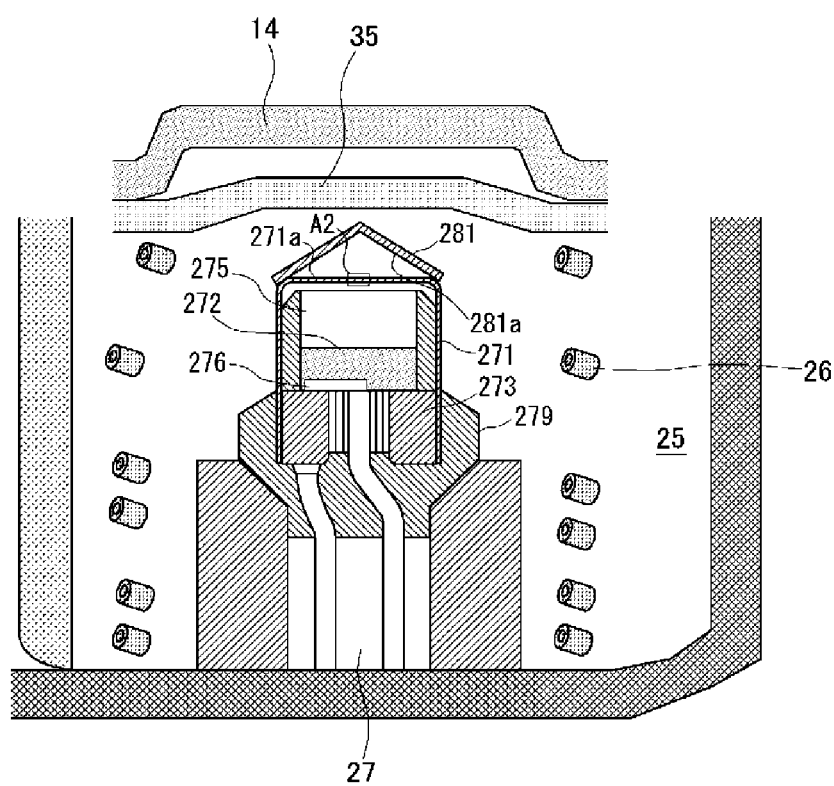
FIG. 11A is a schematic representation of a configuration of a second igniter and a vicinity thereof in the gas generator according to example 3 of the present invention, illustrating a state before combustion of an ignition charge.

Then, such second igniter 27 causes the combustion product to be released outside the accommodating chamber 275 by the rupturing of the predetermined area of the bottom surface 271*a* of the accommodating cup 271. Specifically, as illustrated in FIG. 11A, before combustion of the ignition charge 272, the bottom surface 271*a* of the accommodating cup 271 is covered by the auxiliary cup 281. Thus, the predetermined area of the bottom surface 271*a* (represented as an area belonging to the area A2 in FIG. 11A) is also covered by the auxiliary cup 281. Note that, at this time, a predetermined space is formed by the bottom surface 271*a* of the accommodating cup 271 and the auxiliary cup 281, and the wall surface of the auxiliary cup 281 defining the predetermined space is defined as an auxiliary cup inner wall surface 281*a*. Then, when the predetermined area described above is ruptured by the combustion of the ignition charge 272, the combustion product acts on the auxiliary cup inner wall surface 281*a*. That is, the auxiliary cup inner wall surface 281*a* corresponds to the pressure receiving surface of the present invention. When this happens, the accommodating cup 281 separates away from the accommodating cup 271 and moves in the predetermined direction from the second igniter 27 in the second combustion chamber 25. The auxiliary cup 281 is then restricted in movement by the cushion 35 and the dividing wall 14. Note that the auxiliary cup 281 is fixed to the accommodating cup 271 in the state before combustion of the ignition charge 272 and, by combustion of the ignition charge 272, is separable from the accommodating cup 271. Further, the accommodating cup 271 is anchored to the metal header 273, and thus is not separable from the metal header 273 by combustion of the ignition charge 272. Such an anchoring is achieved by, for example, welding the accommodating cup 271 and the metal header 273.

Figure 11B:
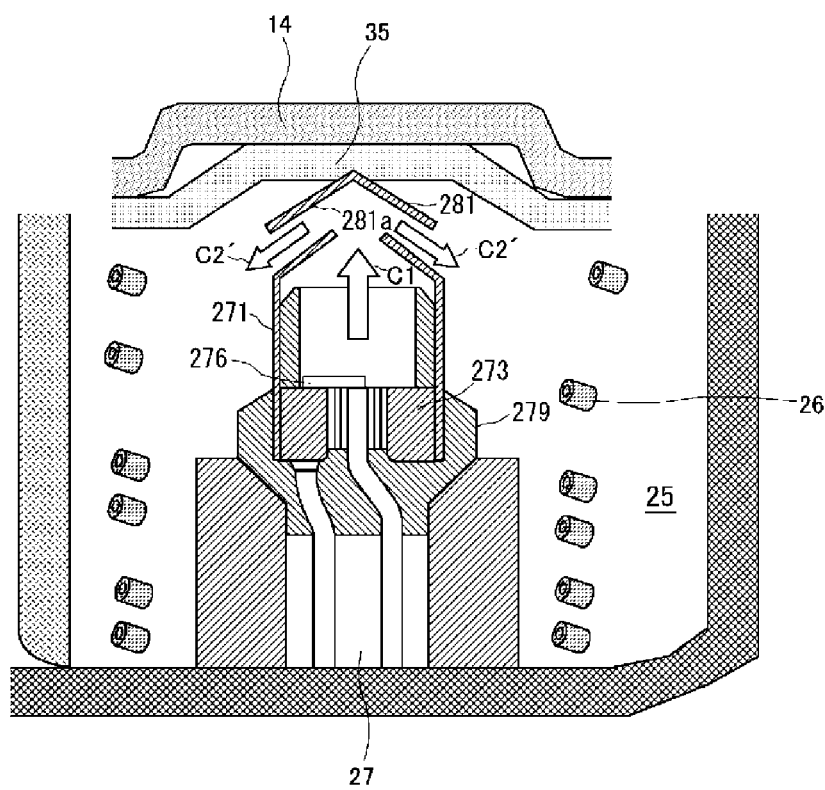
FIG. 11B is a schematic representation of a configuration of the second igniter and the vicinity thereof in the gas generator according to example 3 of the present invention, illustrating a state after combustion of the ignition charge.

Then, when the auxiliary cup 281 is received by the dividing wall 14 with the cushion 35 interposed therebetween, the flow of the combustion product is guided by the auxiliary cup inner wall surface 281*a*, as indicated by arrow C2' in FIG. 11B. As a result, the combustion product is directed toward the metal header 273 (second igniter 27). Thus, the combustion of the second gas generating agent 26 disposed around the second igniter 27 can be promoted.

According to such a gas generator as well, the gas generating agent disposed around the igniter can be properly burned, thus non-uniformity in combustion of the gas generating agent can be suppressed to the extent possible, and a proper combustion-gas-generating ability can be exhibited.

REFERENCE SIGNS LIST

1 Gas generator
2 Upper shell
3 Lower shell
4 Housing
5 Gas discharge port
10 Divider wall
14 Dividing wall
16 Accommodating wall member
21 First combustion chamber
22 First gas generating agent
23 First igniter
25 Second combustion chamber
26 Second gas generating agent
27 Second igniter
31, 35 Cushion
32 Filter
271 Accommodating cup
271*a* Bottom surface
271*b* Peripheral wall
271*c* Opening
271*d*, 271*e* Thinned part
272 Ignition charge
273 Metal header
274 Charge holder
275 Accommodating chamber
276 Bridge wire
277 Insulator
278 Conductive pin
279 Resin collar
281 Auxiliary cup
281*a* Auxiliary cup inner wall surface

What is claimed is:

1. A gas generator comprising an igniter, a combustion chamber, and a restriction part, wherein the igniter includes, an accommodating chamber accommodating an explosive therein, an ignition portion that is provided in the accommodating chamber and ignites the explosive, and a separating part that includes a pressure receiving surface that receives a combustion product generated by a combustion of the explosive at the igniter, the separating part being configured to be separable from the igniter and movable in a predetermined direction by an action of the combustion product on the pressure receiving surface, the combustion chamber being configured to burn a gas generating agent, which is filled outside the accommodating chamber, by the combustion of the explosive at the igniter, the combustion chamber being formed surrounding the igniter, the restriction part being provided in a predetermined position in the predetermined direction from the igniter disposed inside the combustion chamber, the restriction part restricting a movement of the separating part in the predetermined direction, and the separating part further including a guide that directs the combustion product received by the pressure receiving surface toward the igniter, in a state where the movement of the separating part in the predetermined direction being restricted by the restriction part.

2. The gas generator according to claim 1, wherein the igniter further includes:

a header provided with the ignition portion fixed thereto and an accommodating cup that is provided with a bottom surface disposed facing the ignition portion and with a peripheral wall connected to a peripheral edge of the bottom surface and disposed surrounding the ignition portion, the accommodating cup forming the accommodating chamber by the peripheral wall and the bottom surface, and wherein:

the separating part serves as the accommodating cup, an inner wall surface of the accommodating cup serves as the pressure receiving surface, and the peripheral wall, as the guide, directs the combustion product toward the header.

3. The gas generator according to claim 2, wherein:

the accommodating cup is fixed to the header before the combustion of the explosive at the igniter so as to be separable from the header side by the combustion of the explosive at the igniter; and in a state where a movement of the accommodating cup separated in the predetermined direction by the combustion of the explosive at the igniter is restricted by the restriction part, an opening defined by a peripheral edge of the accommodating cup on the header side expands in diameter, and the peripheral wall including the opening expanded in diameter directs the combustion product toward the header.

4. The gas generator according to claim 3, wherein:

the accommodating cup includes, in the peripheral wall, a first fragile part that, by the action of the combustion product, deforms and thus causes the opening of the accommodating cup to expand in diameter.

5. The gas generator according to claim 2, wherein:

the accommodating cup includes, in the peripheral wall, a second fragile part that is caused to break due to the action of the combustion product, whereby a portion of the accommodating cup is separable from the header side; and the peripheral wall at a portion of the accommodating cup separated from the header side, by the breaking of the second fragile part by the combustion of the explosive at the igniter, directs the combustion product toward the header.

6. The gas generator according to claim 5, wherein:

the accommodating cup is both fixed to the header and anchored to the header on a side of an opening defined by a peripheral edge of the accommodating cup on the header side of the peripheral wall and further forms the second fragile part in the peripheral wall near the bottom surface; and a portion of the peripheral wall and the bottom surface are integrally separated from the header side by the breaking of the second fragile part by the combustion of the explosive at the igniter.

7. The gas generator according to claim 1, wherein the igniter further includes:

a header provided with the ignition portion fixed thereto, and an accommodating cup that is provided with a bottom surface disposed facing the ignition portion and with a peripheral wall connected to a peripheral edge of the bottom surface and disposed surrounding the ignition portion, the accommodating cup forming the accommodating chamber by the peripheral wall and the bottom surface, and wherein:

the accommodating cup releases the combustion product outside the accommodating chamber by a rupturing of a predetermined area, the separating part serves as an auxiliary cup that includes the pressure receiving surface that receives the combustion product released from the accommodating cup and that is provided covering the predetermined area of the accommodating cup, and in a state where a movement of the auxiliary cup separated in the predetermined direction away from the accommodating cup by the combustion of the explosive at the igniter is restricted by the restriction part, a portion of the auxiliary cup, as the guide, directs the combustion product toward the igniter.

8. The gas generator according to claim 1, further comprising:

a housing that houses the igniter and includes the combustion chamber in the interior thereof:

the housing further including in the interior thereof, a divider wall that vertically divides the combustion chamber and forms a first combustion chamber positioned on an upper side thereof and the combustion chamber positioned on a lower side thereof and on a bottom surface of the housing, a first igniter for burning a first gas generating agent filled in the first combustion chamber and the igniter for burning the gas generating agent filled in the combustion chamber;

the divider wall including an accommodating wall that surrounds the first igniter disposed on the bottom surface and accommodates the first igniter inside the first combustion chamber;

the restriction part being a portion of the divider wall positioned inside the combustion chamber in the predetermined direction from the igniter; and the guide of the separating part directing the combustion product toward the igniter in a state where the movement of the separating part in the predetermined direction is restricted by the portion of the divider wall.

9. A gas generator, comprising:

an igniter including, an ignition portion provided within an accommodating chamber that accommodates therein an explosive, and a cup covering the accommodating chamber and includes a pressure receiving surface that receives a combustion product generated from the explosive, the cup being configured to be separable from the igniter and movable in a predetermined direction by the combustion product on the pressure receiving surface;

a gas generating agent filled in a combustion chamber and being surrounding the igniter; and a restriction part provided in a predetermined position in the predetermined direction from the igniter and disposed inside the combustion chamber, the restriction part restricting a movement of the cup in the predetermined direction, wherein the combustion product of the explosive reflected by the pressure receiving surface is guided toward the igniter, as a movement of the cup in the predetermined direction is restricted by the restriction part.

10. The gas generator according to claim 9, further comprising:

a metal header disposed and fixed in the cup before the combustion of the explosive, in a state where the movement of the cup separated in the predetermined direction is restricted by the restriction part, an opening defined by a peripheral edge of the cup on the header side expands in diameter, and a peripheral wall of the cup including the opening expands and directs the combustion product toward the igniter.

11. The gas generator according to claim 10, wherein:

the cup includes, in the peripheral wall thereof, a first fragile part that, by the action of the combustion product, deforms and thus causes the opening of the cup to expand in diameter.

12. The gas generator according to claim 11, wherein:

the cup is fixed to the metal header on a side of an opening defined by a peripheral edge of the cup and is provided with the second fragile part in the peripheral wall; and a portion of the peripheral wall is separated from the header at the second fragile part by the combustion of the explosive at the igniter.

13. The gas generator according to claim 9, wherein the cup includes an accommodating cup provided covering the accommodating chamber and an auxiliary cup covering a bottom surface of the accommodating cup, and the auxiliary cup separates away from the accommodating cup and is restricted in movement by the restriction part.

* * * * *